United States Patent
Shah et al.

(10) Patent No.: US 7,864,702 B2
(45) Date of Patent: Jan. 4, 2011

(54) CONTROL AND RECRUITMENT OF CLIENT PERIPHERALS FROM SERVER-SIDE SOFTWARE

(75) Inventors: Safwan Shah, San Jose, CA (US);
Ashim Banerjee, Westminster, CO (US);
Sandeep Gandhi, Santa Clara, CA (US);
Sohail Aslam, San Jose, CA (US);
Narinder Bajwa, Danville, CA (US)

(73) Assignee: Infonox ON The Web, San Jose, CA (US)

( * ) Notice: Subject to any disclaimer, the term of this patent is extended or adjusted under 35 U.S.C. 154(b) by 835 days.

(21) Appl. No.: 11/303,440

(22) Filed: Dec. 16, 2005

(65) Prior Publication Data
US 2006/0159097 A1    Jul. 20, 2006

Related U.S. Application Data

(60) Provisional application No. 60/636,902, filed on Dec. 17, 2004.

(51) Int. Cl.
*H04L 12/28* (2006.01)

(52) U.S. Cl. .................................. 370/254; 370/400

(58) Field of Classification Search ................. 709/201, 709/202, 203
See application file for complete search history.

(56) References Cited

U.S. PATENT DOCUMENTS

| | | | | |
|---|---|---|---|---|
| 6,157,950 | A * | 12/2000 | Krishnan | 709/223 |
| 6,311,165 | B1 * | 10/2001 | Coutts et al. | 705/21 |
| 2003/0084132 | A1 * | 5/2003 | Ohta | 709/221 |
| 2003/0142683 | A1 * | 7/2003 | Lam et al. | 370/401 |
| 2004/0010323 | A1 * | 1/2004 | Martin et al. | 700/3 |
| 2005/0060367 | A1 * | 3/2005 | Brockway et al. | 709/203 |
| 2009/0024746 | A1 * | 1/2009 | Welch | 709/228 |

* cited by examiner

*Primary Examiner*—Chirag G Shah
*Assistant Examiner*—Daniel Mitchell
(74) *Attorney, Agent, or Firm*—Townsend and Townsend and Crew, LLP

(57) ABSTRACT

A client-server arrangement permits recruitment and control of client peripherals to be effected from the server side is described. A client server system has a server device, a client device, and a peripheral device. The client device is in communication with the server device. The peripheral device is in communication with the client device. The client device has a port server to convert data between an IP format and a non-IP format. The peripheral device exchanges data with the port server in the non-IP format. The server device includes a computational device to exchange data with the port server in the IP format.

19 Claims, 5 Drawing Sheets

CONTROL AND RECRUITMENT OF CLIENT PERIPHERALS FROM SERVER-SIDE SOFTWARE

CROSS REFERENCE TO RELATED APPLICATIONS

This application is a nonprovisional of, and claims the benefit of the filing date of, U.S. Prov. Pat. Appl. No. 60/636,902, entitled "CONTROL AND RECRUITMENT OF CLIENT PERIPHERALS FROM SERVER-SIDE SOFTWARE," filed Dec. 17, 2004 by Safwan Shah et al., the entire disclosure of which is incorporated herein by reference for all purposes.

BACKGROUND OF THE INVENTION

This application relates generally to client-server systems. More specifically, this application relates to control and recruitment of client peripherals from server-side software in client-server systems.

Client-server architectures are used in numerous software applications. At its most general level, a client-server architecture is characterized by a relationship between two components of the architecture: a client, which makes a service request; and a server, which fulfills the request. When such architectures are integrated as parts of networks, they provide a convenient way to interconnect functionality across different locations. In many instances, peripheral devices are also integrated into the architecture, providing a mechanism for interaction with the architecture. The interaction provided by a particular peripheral device may be in either direction, sometimes using input devices to collect information that is transmitted to a network and sometimes using output devices to provide information transmitted from a network.

There is considerable variety in the types of software applications that may exploit the client-server architecture, as well as in the types of peripherals that may be integrated into the architecture. For example, certain financial systems may use a network arrangement in which customers may interact with the network through a variety of different peripherals, either directly or with the assistance of a clerk. These peripherals may include input devices like magnetic-stripe readers that read magnetic stripes from credit or debit cards, bar-code scanners that read bar codes from product labels and other items, check readers that read information written in magnetic ink on checks, currency bill validators that check the authenticity of currency, etc. They may also include output devices like printers to generate receipts, statements, and the like, paper and coin currency dispensers that provide coins or bills, currency recyclers, etc. As another example, a client-server architecture could be used as part of an environment-monitoring system in which sensor peripherals are connected with a client device. Such sensors could be used to measure physical parameters in the environment like temperature, pressure, light level, proximity of items, and the like.

Irrespective of what type of peripherals may form part of client-server architecture, such architectures typically have a structure like that shown in FIG. 1. In this drawing, the architecture is denoted by reference number 100 and includes a server device 104 and a plurality of client devices 112. Details of one of the client devices 112-4 is shown in the drawing, with the presence of other client devices shown without explicit detail; each of these other client devices may have a similar structure to that shown for client device 112-4. Each of the server device 104 and the client devices 112 include software, identified in the drawing as server software 108 and client software 116. Peripherals 128 are connected with respective client devices 112 over communications lines 124 using communication ports that are typically serial ports, USB ports, or the like. The peripherals 128 are controlled using drivers 120 under the management of the client software 116 to enable communication over the ports with the peripherals according to the specific type of ports that are used.

Such an arrangement suffers from the disadvantage that maintenance of the architecture requires maintenance both of the server software 108 and of the client software 116 on each of the client devices 112 that may be comprised by the architecture 100. Many architectures have large numbers of client devices 112, making it cumbersome to perform upgrades of the system and to accommodate more routine maintenance of the client software 116 over the multiple devices. There is accordingly a general need in the art for architectures that mitigate some of the issues.

BRIEF SUMMARY OF THE INVENTION

Embodiments of the invention provide a client-server arrangement that permits recruitment and control of client peripherals to be effected from the server side. In a first set of embodiments, a client server system is thus provided, comprising a server device, a client device, and a peripheral device. The client device is provided in communication with the server device. The peripheral device is provided in communication with the client device. The client device comprises a port server configured to convert data between an internet-protocol ("IP") format and a non-IP format. The peripheral device is configured to exchange data with the port server in the non-IP format. The server device comprises a computational device configured to exchange data with the port server in the IP format.

The computational device may be configured to exchange data with the port server by specifying an IP address for the port server. In some embodiments, the port server comprises a plurality of ports, with the peripheral device in communication with the port server through one of the plurality of ports. In such embodiments, the computational device is configured to exchange data with the peripheral device by specifying an IP address for the port server and a port number for the one of the plurality of ports.

In other embodiments, the client device comprises a plurality of client devices in communication with the server device. Each of the plurality of client devices comprises a respective at least one of a plurality of port servers configured to convert data between an IP format and a non-IP format. The server device may then comprise a configuration file specifying a respective IP address for each of the plurality of port servers. In addition, the peripheral device may comprise a plurality of peripheral devices. Each of the peripheral devices is configured to exchange data with one of the port servers in a non-IP format through a respective one of a plurality of ports comprised by one of the port servers. In such embodiments, the configuration file may further specify respective port numbers identifying the plurality of ports. In some instances, different ones of the plurality of peripheral devices may be configured to exchange data with different non-IP formats. In such cases, the configuration file may further specify which of the different non-IP formats to be used with respective ones of the plurality of ports.

In a second set of embodiments, methods are provided of operating a client-server system. The client-server system comprises a server device, a client device in communication with the server device, and a peripheral device in communication with the client device. Non-IP data are transmitted from the peripheral device to a port server comprised by the client device in a non-IP format. The non-IP data are converted into IP data in an IP format with the port server. The IP data are transmitted from the port server to the server device with an operation request. An operation is executed with the server device in accordance with the operation request.

The port server may be identified from a plurality of port servers with the server device from an IP address associated with the port server. The peripheral device may be in communication with the port server through one of a plurality of ports comprised by the port server, permitting the one of the plurality of ports to be identified with a port number.

In some embodiments, the client device comprises a plurality of client devices, each of which comprises a respective one of the plurality of port servers. In turn, each of the port servers comprises a respective plurality of ports. The server device comprises a configuration file specifying a respective IP address for each of the plurality of port servers and respective port numbers for each of the plurality of ports. The port server and the one of the plurality of ports are identified by retrieving the specified respective IP address for the port server and respective port number for the one of the plurality of ports from the configuration file.

In addition, the peripheral device may comprise a plurality of peripheral devices in communication with the client device through the plurality of ports. Different ones of the plurality of peripheral devices may be configured to exchange data with different non-IP formats. The configuration file then further specifies which of the different non-IP formats to be used with specified combinations of the IP addresses and port numbers. An identification of which of the different non-IP formats to be used with the peripheral device is retrieved from the configuration file by retrieving an identification of the non-IP format specified for a combination of the IP address associated with the port server and the port number.

In some instances, an IP response to the operation request may be transmitted from the server device to the port server in the IP format. The IP response is accordingly converted to a non-IP response in the non-IP format with the port server. The non-IP response is transmitted from the port server to the peripheral device.

In a third set of embodiments, a method is provided of upgrading a legacy client-server arrangement. The client-server arrangement comprises a server device and a client device in communication with the server device. A port server is installed as part of the client device, with the port server being configured to convert data between an IP format and a non-IP format. A peripheral device is installed in communication with the port server, with the peripheral device being configured to exchange data with the port server in the non-IP format. Software is installed in the server device to configure the server device to exchange data with the port server in the IP format.

In some embodiments, the client device comprises a plurality of client devices in communication with the server device. In such instances, respective ones of a plurality of port servers may be installed as part of respective ones of the plurality of client devices. A configuration file may be installed in the server device accessible by the software, with the configuration file specifying a respective IP address for each of the plurality of port servers.

In addition, a plurality of peripheral devices may be installed in communication with the port server. Each of the peripheral devices is configured to exchange data with the port server in a non-IP format through a respective one of a plurality of ports comprised by the port server. The configuration file then further specifies a respective port number for each of the plurality of ports.

Different ones of the plurality of peripheral devices may be configured to exchange data with different non-IP formats. In such instances, the configuration file may further specify which of the different non-IP formats to be used with respective ones of the plurality of ports.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
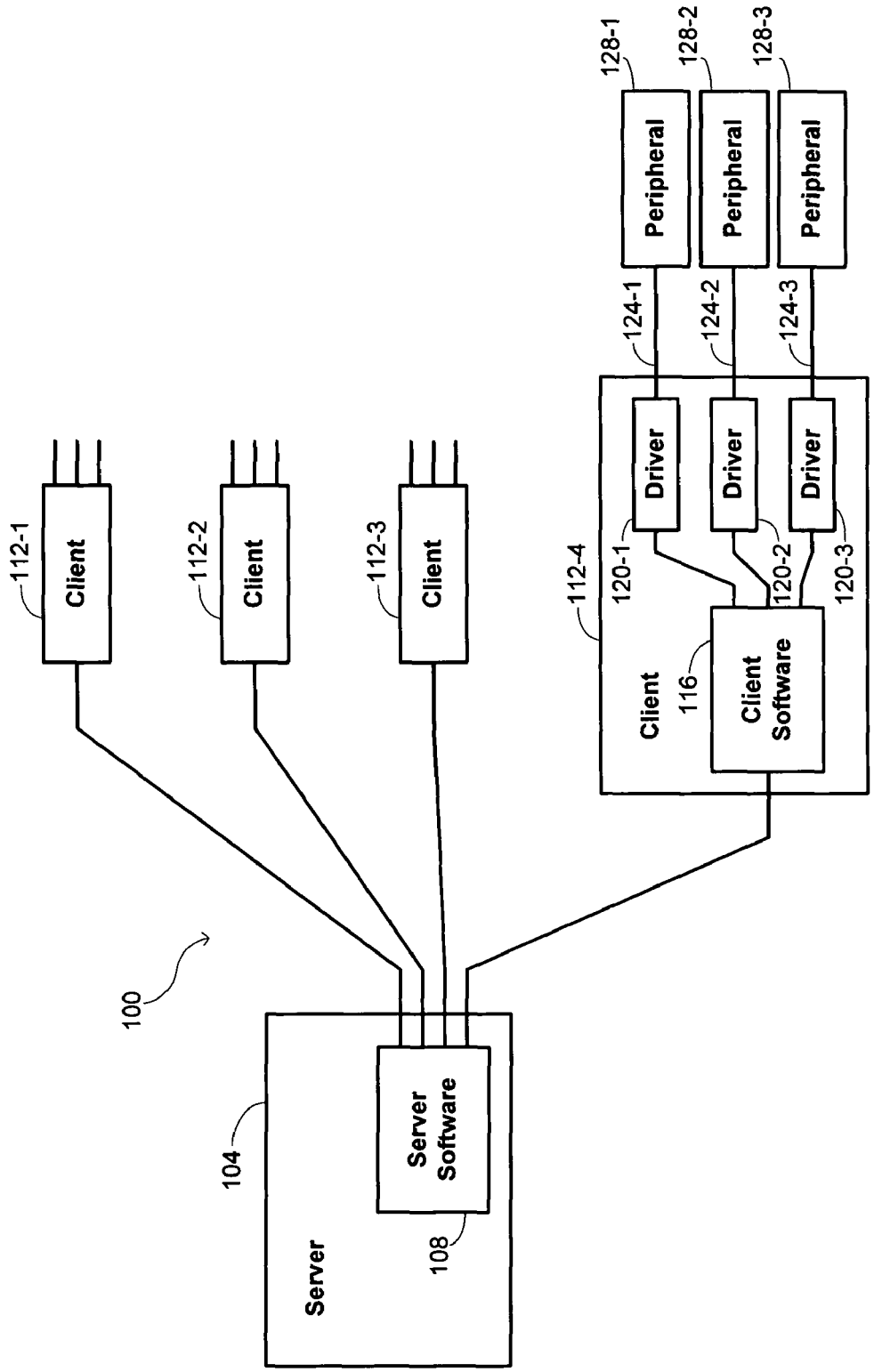
FIG. 1 is a schematic illustration of a structure for a conventional client-server architecture.

Embodiments of the invention implement a client-server architecture that recruits peripherals as dictated by server-side logic rather than by client-side logic. In such a system, peripherals no longer act as client-side appendages, as is the case with the structure shown in FIG. 1, but are instead intimately embedded with server-side software. Such an approach permits peripherals to be used optimally while significantly reducing the maintenance and upkeep of client-side software.

Figure 2:
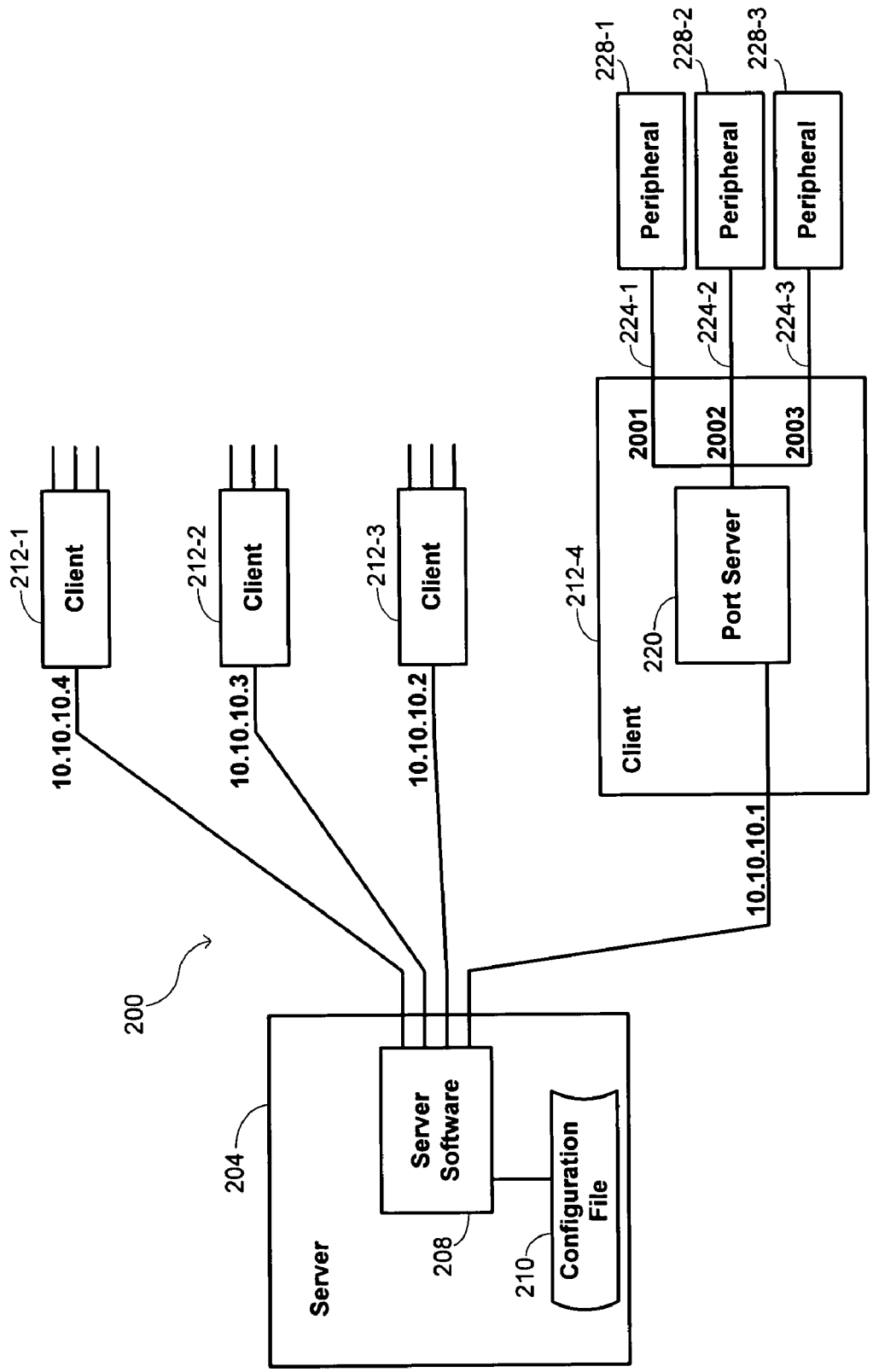
FIG. 2 is a schematic illustration of a structure for a client-server architecture in accordance with an embodiment of the invention.

A general overview of such an architecture is shown schematically in FIG. 2. In this drawing, the architecture is denoted with reference number 200 and again comprises a server device 204 and a plurality of client devices 212. Details are shown for one of the client devices 212-4; each of the client devices 212 will generally have a similar structure even though those details are not shown for every client device in the drawing. Each of the client devices, either with or without a PC, comprises a port server 220, which is a device that performs conversions between an Internet protocol ("IP") and one or more non-IP data formats. Such a port server 220 may be integrated into the computing hardware of the client device 212 as illustrated for the embodiment in FIG. 2, or may be a separate physical device. Regardless of whether the port server 220 is integrated or separate, it is provided in communication with one or more peripherals 228 over communications links 224. The communications links 224 may exchange information using a non-IP data format, such as a serial data format, parallel data format, USB data format, or the like, often depending on the specific characteristics of the individual peripherals with which data are exchanged. The peripherals 228 themselves may thus generally comprise any type of peripheral device known in the art. Merely by way of example, peripherals 228 that may be used include peripheral devices suitable for integration with a financial client-server architecture. These include input devices such as magnetic-stripe readers, bar-code scanners, magnetic-ink readers, check readers, currency bill validators, and the like, as well as output devices such as printers, currency bill dispensers, coin dispensers, currency recyclers, and the like; in some instances, the peripheral devices may combine input and output functionality, such as in instances where a combined currency bill validator and dispenser is used. As a further example, peripherals 228 may include peripheral devices suitable for environment-monitoring functioning, including such devices as sensors to measure physical parameters like temperature, pressure, proximity, light level, and the like.

The different types of peripherals 228 will naturally make use of different types of data and may use different communications formats to communicate with the client devices 212. Such differences are largely transparent to the client-server interaction as a consequence of the functionality of the port server 220, which is capable of communication over networks in IP format regardless of the format of data received from the various peripherals 228. Thus, in the case of a port server 220 incorporated into a client computing hardware platform, the client hardware 212 may be assigned an IP address. This is illustrated in FIG. 2, where each client device 212 has an assigned IP address, with the exemplary client device 212-4 having IP address 10.10.10.1. Each peripheral, regardless of the data protocol and format that it uses, may be assigned a specific port number on that IP address. In the illustration, peripheral 228-1 communicates with port 2001 of the port server 220 over communications link 224-2, peripheral 228-2 communicates with port 2002 of the port server 220 over communications link 224-2, and peripheral 228-3 communications with port 2003 of the port server 220 over communications link 224-3. For example, if the client-server architecture 200 were to be used in financial applications, with peripherals 228-1, 228-2, and 228-3 respectively corresponding to a magnetic-stripe reader, a bar-code reader, and a printer, the magnetic-stripe reader could be addressed using IP address 10.10.10.1, port 2001, the bar-code reader could be addressed using IP address 10.10.10.1, port 2002, and the printer could be addressed using IP address 10.10.10.1, port 2003.

Such addressing is coordinated by server software 208 resident on the server device 204. Relationships between peripherals 228 and their IP addresses/port numbers may be maintained on the server side using a configuration file 210 that may also define the data format expected from the various peripheral devices 228. Equivalents to the configuration file may be used in alternative embodiments, such as in the from of a database entry or the like. Such an arrangement enables the server software 208 to communicate with the peripherals 228 regardless of the parameter they are transmitting or of the communications protocol they may be following. With the structure illustrated in FIG. 2, all that is needed for successful integration is knowledge of the IP address and port number assigned to each peripheral 228 and the format of data exchanged with that peripheral 228.

Figure 3:
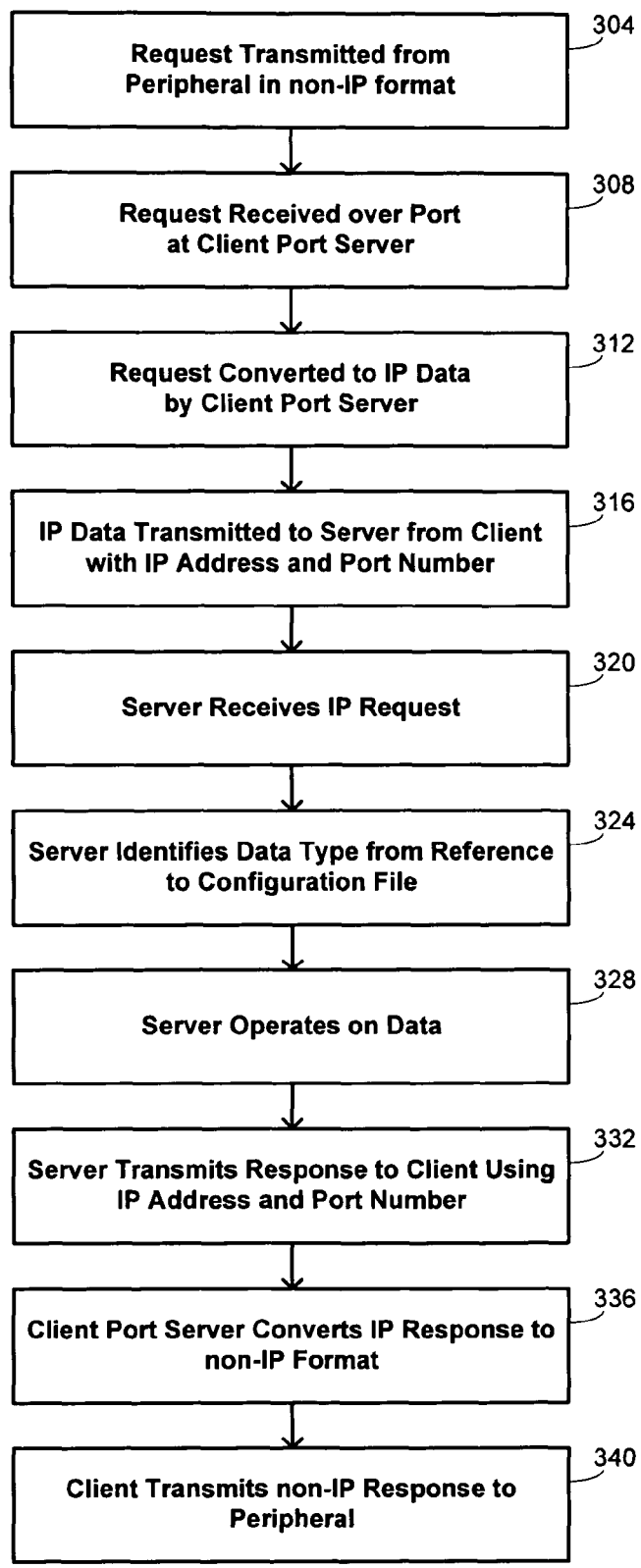
FIG. 3 is a flow diagram summarizing methods of operating a peripheral connected to a client device in the architecture of FIG. 2.

What this arrangement effectively accomplishes is permitting peripherals to be viewed as being attached to server-side software, rather than being attached to client-side software as is conventional in the prior art. Benefits to this approach include a reduction, or even elimination, of client-side software, thereby rending it easier to perform upgrades and to maintain the client devices, particularly for systems having large numbers of client devices. FIG. 3 provides a flow diagram that summarizes methods by which the architecture of FIG. 2 may be used in performing client-server operations with a peripheral. Such operations typically begin as indicated at block 304 with a request for an operation being transmitted from a peripheral 228. Such a request depends on the specific functionality of the peripheral 228, but could be a request for a bank-account balance to be used in processing a financial transaction where a magnetic-stripe card has been presented, could be a request for action to be taken when a temperature measured by a sensor has fallen below a defined level, and the like. The request is transmitted in a non-IP format characteristic of the type of peripheral 228 used.

At block 308, this non-IP request is received at a client port server 220, where it is converted to IP data. As previously described, such IP data is suitable for transmission from the client device 212 to a server device 204 with an identifying IP address and port number. The IP address identifies which the client device 212 from which it is transmitted, and the port number identifies the particular peripheral 228 in communication with that client device 212 that originated the request. The IP request is accordingly received by the server device 204 at block 320. The configuration file may be used at block 324 to identify the type of data associated with the IP address and port number associated with the peripheral 228, permitting the server to operate on the received data to execute the desired operation at block 328.

A response may sometimes be transmitted back to the peripheral device 228. This may be initiated at block 332 by the server device 204 transmitting the response to the client device 212 using the IP address and port number corresponding to the peripheral 228. This transmission is received by the port server 220, which converts the IP response to the appropriate non-IP format for the peripheral at block 340, permitting the client to transmit the non-IP response onto the peripheral 228 at block 340.

Figure 4:
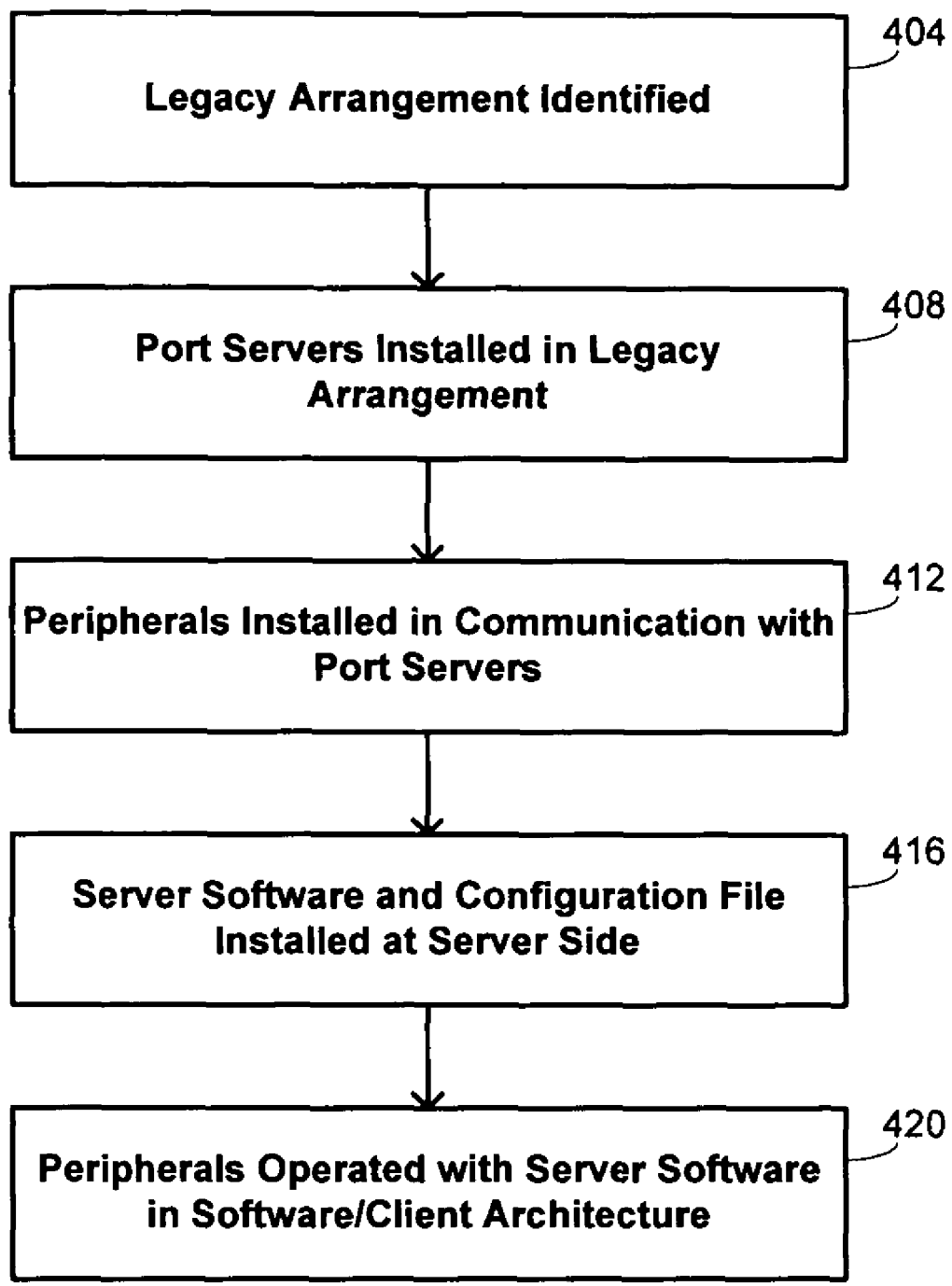
FIG. 4 is a flow diagram summarizing methods of upgrading a legacy structure to implement the client-server architecture of FIG. 2.

Having peripherals effectively attached to server-side software in client-server architectures, rather than being attached to client-side software, also simplifies upgrading of certain legacy installations. This is illustrated with the flow diagram of FIG. 4, in which a legacy arrangement to be upgraded is identified at block 404. The legacy client devices may lack sufficient computing power to enable connection of sophisticated peripherals. But this is less of a barrier in implementing an architecture like that shown in FIG. 2 where the peripherals will effectively be attached to server-side software. Port servers are installed in the legacy arrangement at block 408 and the peripherals appropriate for the upgrade are installed in communication with the port servers at block 412. The port servers are virtually connected via a server device and inclusion of the port servers on the client side of the arrangement permits the peripherals to become architecturally a component of server-side software. Such software is installed at block 416, together with a configuration file that permits the server software to identify respective IP addresses and port numbers for the installed peripherals. The resulting arrangement permits the peripherals to be recruited by the server side applications only when required by program logic and to remain idle otherwise. The peripherals are accordingly operated with server software at block 420 as described previously.

Merely by way of example, one type of legacy client-server architecture that may be beneficially updated in this way is used in providing point-of-sale financial services. Such architectures typically include a server that communicates with geographically distributed point-of-sale devices located in grocery stores, department stores, gasoline pumps, and the like. Such point-of-sale devices commonly have very limited computational power that acts as a barrier to upgrading them with more sophisticated peripheral devices like magnetic-stripe readers, magnetic-ink readers, currency bill validators, and the like. Such a barrier is overcome using the method of FIG. 4 to upgrade the architecture to have a structure like that shown in FIG. 2 since very little computational power is needed on the client side. Other types of legacy arrangements that may similarly be upgraded will be evident to those of skill in the art after reading this description.

Figure 5:
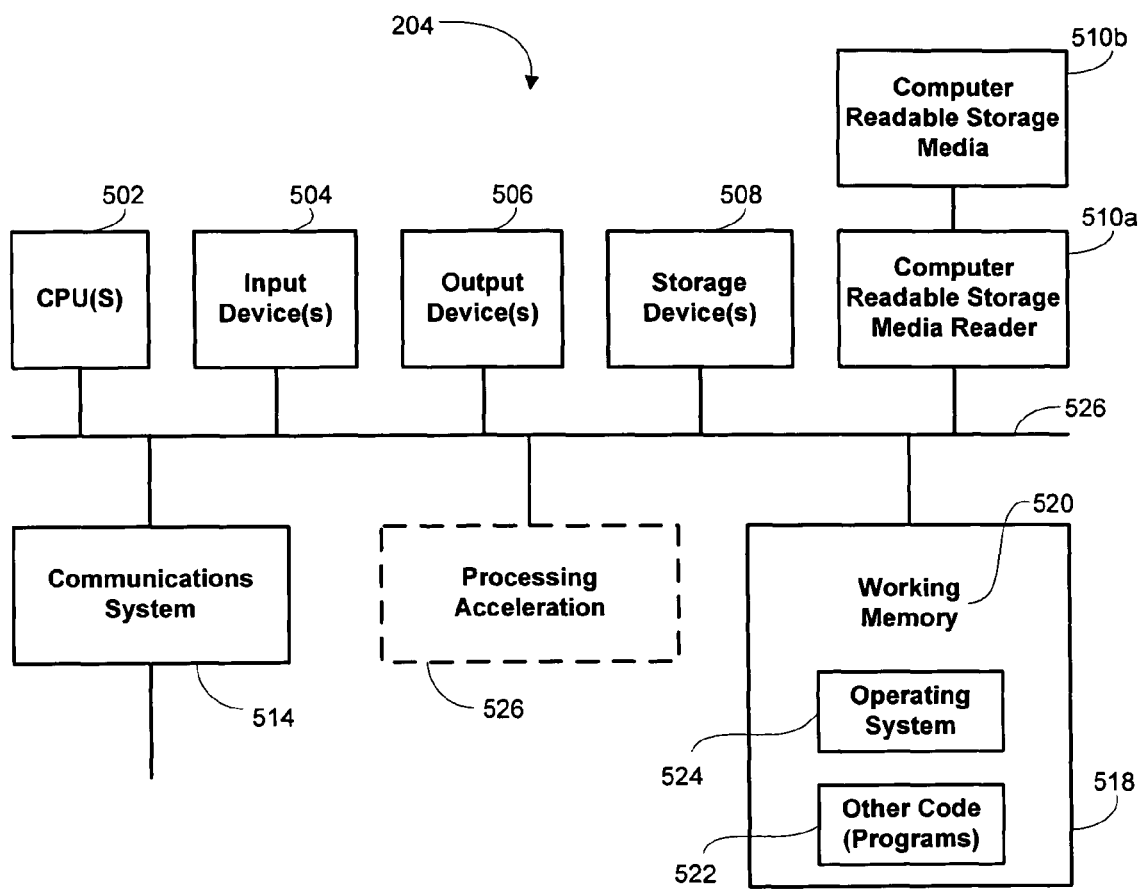
FIG. 5 is a schematic illustration of a structure for a server that may be used in the client-server architecture of FIG. 2

FIG. 5 provides a schematic illustration of a structure that may be used to implement the server device 204. FIG. 5 broadly illustrates how individual system elements may be implemented in a separated or more integrated manner. The server device 204 is shown comprised of hardware elements that are electrically coupled via bus 526, including a processor 502, an input device 504, an output device 506, a storage device 508, a computer-readable storage media reader 510*a*, a communications system 514, a processing acceleration unit 516 such as a DSP or special-purpose processor, and a memory 518. The computer-readable storage media reader 510*a* is further connected to a computer-readable storage medium 510*b*, the combination comprehensively representing remote, local, fixed, and/or removable storage devices plus storage media for temporarily and/or more permanently containing computer-readable information. The communications system 514 may comprise a wired, wireless, modem, and/or other type of interfacing connection and permits data to be exchanged with client devices 212 provided in communication with the server device 204, as described in connection with FIG. 2. The storage device 508 may comprise the configuration file 210 in some embodiments.

The server device 204 also comprises software elements, shown as being currently located within working memory 520, including an operating system 524 and other code 522, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A client-server system comprising:
    a server device;
    a first client device provided in communication with the server device, the first client device comprising a first port server configured to convert data between an internet-protocol ("IP") format and a first peripheral bus communication protocol;
    a second client device provided in communication with the server device, the second client device comprising a second port server configured to convert data between the internet-protocol ("IP") format and a second peripheral bus communication protocol;
    a first peripheral device provided in communication with the first client device via the first peripheral bus communication protocol;
    a second peripheral device provided in communication with the second client device via the second peripheral bus communication protocol; and
    a configuration file maintained on the server,
    wherein:
        the first peripheral device is configured to exchange data with the first port server in non-IP formats;
        the second peripheral device is configured to exchange data with the second port server in non-IP formats;
        a first IP address is assigned to the first client device;
        a second IP address is assigned to the second client device;
        a first port is assigned to the first peripheral device;
        a second port is assigned to the second peripheral device;
        the server device comprises a computational device configured to exchange data with the first and second port servers in the IP format; and
        the configuration file links the first IP address of the first client device and the first port number, such that the server device can recruit the first peripheral device;
        the configuration file links the second IP address of the second client device and the second port number, such that the server device can recruit the second peripheral device;
        the configuration file permits the first and second peripheral devices to function architecturally as components of the server device such that a server-side software provides functionality for both the first and second peripheral devices.

2. The client-server system recited in claim 1 wherein the computational device is configured to exchange data with the port server by specifying an IP address for the port server.

3. The client-server system recited in claim 1 wherein:
    the port server comprises a plurality of ports;
    the first peripheral device is in communication with the port server through one of the plurality of ports; and
    the computational device is configured to exchange data with the first peripheral device by specifying an IP address for the port server and a port number for the one of the plurality of ports.

4. The client-server system recited in claim 1 wherein the client device comprises a plurality of client devices in communication with the server device, each of the plurality of client devices comprising a respective at least one of a plurality of port servers configured to convert data between an IP format and a non-IP format.

5. The client-server system recited in claim 4 wherein the server device comprises a configuration file specifying a respective IP address for each of the plurality of port servers.

6. The client-server system recited in claim 1 wherein:
    the first and second peripheral devices are configured to exchange data with different non-IP formats; and
    the configuration file further specifies which of the different non-IP formats to be used with the first and second ports.

7. A method of operating a client-server system comprising a server device, a first client device in communication with the server device, a second client device in communication with the server device, a first peripheral device in communication with the first client device, and a second peripheral device in communication with the second client device, the method comprising:

transmitting non-IP data from the first peripheral device to a first port server comprised by the first client device in a first non-IP format, wherein the first non-IP format is a first bus protocol;

converting the non-IP data into a first set of IP data in an IP format with the first port server, wherein the first set of IP data comprises a first IP address linked to the first client device and a first port number linked to the first peripheral device;

transmitting non-IP data from the second peripheral device to the second port server comprised by the second client device in a second non-IP format, wherein the second non-IP format is a second bus protocol;

converting the non-IP data into a second set of IP data in an IP format with the second port server, wherein the second set of IP data comprises a second IP address linked to the second client device and a second port number linked to the second peripheral device;

transmitting the first set of IP data from the first port server to the server device with a first operation request;

transmitting the second set of IP data from the second port server to the server device with a second operation request; and executing a first operation with the server device in accordance with the first operation request and executing a second operation with the server device in accordance with the second operation request, wherein the server device executes the first operation request and the second operation request with server-side software as though the first peripheral device and second peripheral device are architecturally components of the server device.

8. The method recited in claim 7 further comprising identifying the port server from a plurality of port servers with the server device from an IP address associated with the port server.

9. The method recited in claim 8 where the first peripheral device is in communication with the port server through one of a plurality of ports comprised by the port server, the method further comprising identifying the one of the plurality of ports with a port number.

10. The method recited in claim 9 wherein:

the client device comprises a plurality of client devices, each such client device comprising a respective one of the plurality of port servers, each of the port servers comprising a respective plurality of ports;

the server device comprises a configuration file specifying a respective IP address for each of the plurality of port servers and respective port numbers for each of the plurality of ports; and identifying the port server and identifying the one of the plurality of ports comprises retrieving the specified respective IP address for the port server and respective port number for the one of the plurality of ports from the configuration file.

11. The method recited in claim 10 wherein:

the first peripheral device comprises a plurality of peripheral devices in communication with the client device through the plurality of ports, different ones of the plurality of peripheral devices being configured to exchange data with different non-IP formats; and the configuration file further specifies which of the different non-IP formats to be used with specified combinations of the IP addresses and port numbers, the method further comprising retrieving an identification of which of the different non-IP formats to be used with the peripheral device from the configuration file by retrieving an identification of the non-IP format specified for a combination of the IP address associated with the port server and the port number.

12. The method recited in claim 8 wherein:

the client device comprises a plurality of client devices, each such client device comprising a respective one of the plurality of port servers;

the server device comprises a configuration file specifying a respective IP address for each of the plurality of port servers; and identifying the port server comprises retrieving the specified respective IP address for the port server from the configuration file.

13. The method recited in claim 7 further comprising:

transmitting an IP response to the operation request from the server device to the port server in the IP format;

converting the IP response to a non-IP response in the non-IP format with the port server; and transmitting the non-IP response from the port server to the peripheral device.

14. A method of upgrading a legacy client-server arrangement comprising a server device and a plurality of client devices in communication with the server device, the method comprising:

installing a first port server as part of a first client device, the first port server being configured to convert data between an IP format and a first non-IP format;

installing a first peripheral device in communication with the first port server, the first peripheral device being configured to exchange data with the first port server in the first non-IP format, wherein the first non-IP format is a first bus protocol;

installing a second port server as part of a second client device, the second port server being configured to convert data between the IP format and a second non-IP format;

installing a second peripheral device in communication with the second port server, the second peripheral device being configured to exchange data with the second port server in the second non-IP format, wherein the second non-IP format is a second bus protocol; and installing software in the server device to configure the server device to exchange data with the first port server and the second port server in the IP format, wherein data exchanged with the first port server for the first peripheral device indicates a first port number linked to the first peripheral device, data exchanged with the second port server for the second peripheral device indicates a second port number linked to the second peripheral device, and the software in the server device permits peripheral functionality as though the first and second peripheral devices are operated by server-side software such that the server-side software provides functionality for both the first and second peripheral devices.

15. The method recited in claim 14 wherein:

the client device comprises a plurality of client devices in communication with the server device; and installing the port server comprises installing respective ones of a plurality of port servers as part of respective ones of the plurality of client devices, the method further comprising installing a configuration file in the server device accessible by the software, the configuration file specifying a respective IP address for each of the plurality of port servers.

16. The method recited in claim 15 wherein:

installing the first peripheral device comprises installing a plurality of peripheral devices in communication with the port server, each of the plurality of peripheral devices being configured to exchange data with the port server in a non-IP format through a respective one of a plurality of ports comprised by the port server; and the configuration file further specifies a respective port number for each of the plurality of ports.

17. The method recited in claim 14 wherein:

the first and second peripheral devices are configured to exchange data with different non-IP formats; and the configuration file further specifies which of the different non-IP formats to be used with the first and second peripheral devices.

18. The client-server system recited in claim 1 wherein the non-IP format and the peripheral bus communication protocol is universal serial bus protocol.

19. The client-server system recited in claim 1 wherein the non-IP format and the peripheral bus communication protocol uses a parallel data format.

* * * * *